United States Patent
Benham et al.

(10) Patent No.: US 8,372,771 B2
(45) Date of Patent: Feb. 12, 2013

(54) SYSTEM AND METHOD FOR CATALYST ACTIVATION

(75) Inventors: Elizabeth A. Benham, Spring, TX (US); Max P. McDaniel, Bartlesville, OK (US)

(73) Assignee: Chevrton Phillips Chemical Company LP, The Woodlands, TX (US)

( * ) Notice: Subject to any disclaimer, the term of this patent is extended or adjusted under 35 U.S.C. 154(b) by 188 days.

(21) Appl. No.: 12/706,559

(22) Filed: Feb. 16, 2010

(65) Prior Publication Data

US 2011/0201768 A1  Aug. 18, 2011

(51) Int. Cl.
 *B01J 38/12* (2006.01)
 *B01J 38/20* (2006.01)
 *B01J 23/00* (2006.01)
 *C08F 4/24* (2006.01)

(52) U.S. Cl. ............. 502/49; 502/38; 502/319; 526/106

(58) Field of Classification Search .............. 502/38, 502/49, 319, 256; 34/443, 456, 509
See application file for complete search history.

(56) References Cited

U.S. PATENT DOCUMENTS

| | | | |
|---|---|---|---|
| 2,987,487 A * | 6/1961 | Cottle et al. | 502/319 |
| 4,136,061 A | 1/1979 | Hogan et al. | |
| 4,151,122 A * | 4/1979 | McDaniel et al. | 502/236 |
| 4,308,172 A | 12/1981 | McDaniel | |
| 5,235,009 A | 8/1993 | Hogan | |
| 7,179,426 B2 | 2/2007 | Hottovy et al. | |
| 7,375,169 B1 * | 5/2008 | Smith et al. | 526/104 |
| 7,615,510 B2 | 11/2009 | McDaniel et al. | |
| 2004/0116277 A1 | 6/2004 | Clarkson et al. | |
| 2005/0255987 A1 * | 11/2005 | McDaniel et al. | 502/38 |
| 2006/0172884 A1 | 8/2006 | Schneider et al. | |

FOREIGN PATENT DOCUMENTS

WO   WO 2005/052012 A1   6/2005
WO   WO 2005/113146 A1   12/2005

OTHER PUBLICATIONS

Collins et al. "The activation of Phillips Cr/silica catalyst V. Stability of Cr(VI)". Applied Catalysis A: General 335 (2008) 252-161.*
McDaniel, MP, et al., The Activation of Phillips CR/silica Catalysts V. Stability of Cr(VI) *Applied Catalysis A: General*, 335 (2008) 252-261.
Chien, Chin-Cheng, et al. Effect of heat-treatment conditions on Cu-Cr/$\gamma$-alumina catalyst for carbon monoxide and propene oxidation, *Applied Catalysis A: General*, 131 (1995) 73-87.
Sychev, Mikhail, et al., Chromia- and Chromium Sulfide-Pillared Clays: Preparation, Characterization, and Catalytic Activity for Thiophene Hydrodesulfurization, *Journal of Catalysis*, 168 (1997) 245-254.
International Application PCT/US2011/021097 Search Report dated Jun. 9, 2011.

* cited by examiner

*Primary Examiner* — David W Wu
*Assistant Examiner* — Elizabeth Eng
(74) *Attorney, Agent, or Firm* — Fletcher Yoder P.C

(57) ABSTRACT

A system and method for activating chromium catalyst, including: increasing temperature of a chromium catalyst at a first rate for a first period of time to a first temperature; and increasing temperature of the chromium catalyst at a second rate for a second period of time from the first temperature to a second temperature, wherein the first rate is greater than the second rate, and wherein the first period precedes the second period.

20 Claims, 8 Drawing Sheets

SYSTEM AND METHOD FOR CATALYST ACTIVATION

BACKGROUND

The present invention relates generally to polyolefin production and, more specifically, to techniques that improve the catalyst activation in polyolefin production processes.

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Polyolefins may be produced from various monomers, such as ethylene, propylene, butene, pentene, hexene, octene, decene, and other building blocks. If one monomer is used for polymerization, the polymer is referred to as a homopolymer, while incorporation of different monomers creates a copolymer or terpolymer, and so on. Monomers may be added to a polymerization reactor, such as a liquid-phase reactor or a gas-phase reactor, where they are converted to polymers. In the liquid-phase reactor, an inert hydrocarbon, such as isobutane, propane, n-pentane, i-pentane, neopentane, and/or n-hexane, may be utilized as a diluent to carry the contents of the reactor. A catalyst may also be added to the reactor to facilitate the polymerization reaction. An example of such a catalyst is a chromium oxide containing hexavalent chromium on a silica support. Unlike the monomers, catalysts are generally not consumed in the polymerization reaction.

As polymer chains develop during polymerization, solid particles known as "fluff" or "flake" are produced. The fluff may possess one or more melt, physical, rheological, and/or mechanical properties of interest, such as density, melt index (MI), melt flow rate (MFR), copolymer content, comonomer content, modulus, and crystallinity. Different fluff properties may be desirable depending on the application to which the polyolefin fluff or subsequently pelletized fluff is to be applied. The reaction conditions within the reactor, such as temperature, pressure, chemical concentrations, polymer production rate, and so forth, may be affect the fluff properties.

In addition, the catalyst activity may affect the fluff properties. Catalyst activity may also affect the fluff production rate of the polymerization reactor. Catalyst activity may be defined as the mass of polymer produced per the mass of catalyst utilized. To increase the activity of the catalyst, raw catalyst may be activated or converted (e.g., changed oxidation state) in a catalyst preparation process (e.g., in an activator vessel with an external furnace) prior to its introduction into the polymerization reactor. In the case of a chromium (Cr) oxide catalyst, a catalyst activator upstream of the polymerization reactor may convert $Cr^{3+}$ to $Cr^{6+}$, for example, to improve the quality of the catalyst and to increase the activity of the catalyst.

In an industry where billions of pounds of polyolefin product are produced per year, small incremental improvements, for example, in catalyst activity, monomer yield, energy efficiency, diluent recovery, and so forth, can generate significant cost savings in the manufacture of polyolefins. For example, catalyst research has produced commercial catalysts with activity values that are orders of magnitudes higher than those of two to three decades ago, resulting in a striking reduction in the amount of catalyst utilized per pound of polymer produced, and also reducing the amount of downstream processing (and equipment) used to deactivate and/or remove residual catalyst in the polymer product. Further advances in the processing and activation of the catalyst may result in increased polymerization rates, increased polyolefin production rate, and improved polyolefin fluff properties.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
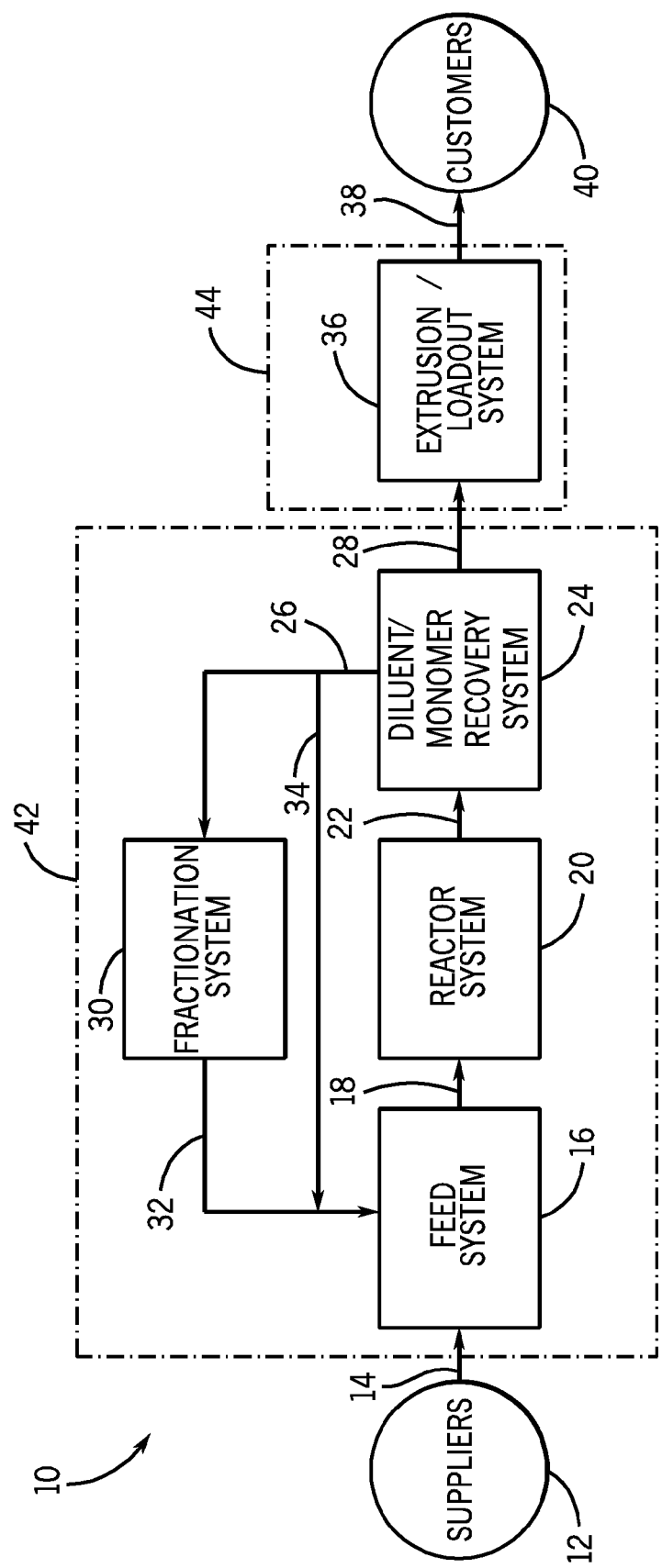
FIG. 1 is a block flow diagram depicting an exemplary polyolefin manufacturing system for producing polyolefins in accordance with an embodiment of the present technique.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

I. Introduction

Polyolefin production capacity for a polymerization reactor may be limited by the amount of catalyst that can be activated (in the upstream activation process) and by the activity of the catalyst. Over many decades, commercial catalyst activator systems upstream of the polymerization reactor have often been overloaded in an attempt to produce more catalyst. As a result, the quality of the catalyst activation has deteriorated in certain instances. Such deterioration may lead to loss in catalyst activity and subsequent loss of polymer properties.

In response, the present techniques provide for novel control of the catalyst activation processes. The settings of the catalyst activation process are manipulated to improve catalyst quality leading to increased catalyst activity and improved polymer quality. Such techniques may be implemented without penalty in polyolefin production rates. The techniques increase catalyst conversion or the rate of conversion (e.g., change in oxidation state of the catalyst) in the activation of the catalyst (e.g., chromium-based catalyst) in catalyst preparation processes upstream of the polymerization reactor. Thus, as explained below, the amount of catalyst activation is increased, providing for increased throughput of catalyst in the catalyst preparation processes and the subsequent increase in polyolefin production, as well as improving the properties of the manufactured polyolefin.

As discussed below (see sections III and IV), such increased catalyst conversions or conversion rates may be accomplished, for example, by altering the rate at which the catalyst is heated during the activation process. In particular, the technique may provide for a multi-linear or non-linear (e.g., substantially logarithmic) ramp rate in temperature of the catalyst in the activator vessel. The ramp rate is generally decelerating as the temperature of the catalyst approaches the desired maximum or hold temperature. This is in contrast to a conventional linear ramp of the catalyst. Further, the rate of air flow through the catalyst in the activator vessel may be increased to improve the catalyst conversion rate. In particular, the selected temperature profile of the catalyst can be optionally accompanied by increasing air flow through the catalyst in the activator vessel during the deceleration in rate of the catalyst temperature increase. Again, such manipulation of the catalyst activation process increases activation (or conversion) of the catalyst. The higher activity catalyst may result in decreased operating costs, and also provide greater polymer production capacity when the limiting factor is catalyst related. Moreover, a higher melt index potential of the polyolefin polymer due to increased catalyst activity may result in better operability of the reactor and better polyolefin product.

Lastly, the techniques provide for flexibility in weighting the desired benefits. For instance, with increased rates of conversion (e.g., in changing the oxidation of chromium catalyst from $Cr^{3+}$ to $Cr^{6+}$), several options of implementation are available. For example, the same amount of conversion may be maintained but with a shorter time in the catalyst activator vessel, providing for increased throughput of mass of total catalyst. On the other hand, the typical activation time may be maintained but with increased amounts of catalyst converted, providing for higher activity catalyst. In other example, these factors may be balanced such that both increased amounts of conversion and a shorter time in the catalyst activator vessel are realized. Thus, factors such as increases in total conversion, increased throughput, decreased time, and other aspects may be implemented.

To facilitate discussion of the present techniques, the disclosure is presented in sections. Section I introduces exemplary uses for polyolefins. Section II is a general overview of the polyolefin production process. Section III details the catalyst activation system utilized in the polyolefin production process. Section IV outlines techniques to improve catalyst activation. Examples of the present techniques that provide for increasing the conversion rate of catalysts in polyolefin production are discussed throughout the disclosure. Furthermore, though the discussion at times may focus on the production of polyethylene and its copolymer, the disclosed techniques afford benefits in improved production of other polyolefins, such as polypropylene, polybutylene, and so on. Finally, it should be apparent that the various techniques may be implemented in a multiplicity of combinations.

II. Polyolefin Production Process—An Overview

Products made from polyolefins have become increasingly prevalent in society as plastic products. One benefit of these polyolefins is that they are generally non-reactive when put in contact with various goods or products. In particular, plastic products from polyolefins are used for retail and pharmaceutical packaging (such as display bags, bottles, and medication containers), food and beverage packaging (such as juice and soda bottles), household and industrial containers (such as pails, drums and boxes), household items (such as appliances, furniture, carpeting, and toys), automobile components, fluid, gas and electrical conduction products (such as cable wrap, pipes, and conduits), and various other industrial and consumer products. Furthermore, polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

In the production of polyolefin, polymerization reactor(s), which polymerize monomer into polyolefin, and extruder(s), which convert the polyolefin into polyolefin pellets, are typically continuous operations. However, a variety of both continuous and batch systems may be employed throughout the polyolefin process. For example, a catalyst activation system, such as the exemplary system described below, may be a batch system.

Turning now to the drawings, and referring initially to FIG. 1, a block diagram depicts an exemplary manufacturing process 10 for producing polyolefins, such as polyethylene homopolymer, copolymer, and/or terpolymer. Common polyethylene copolymers may include hexane, butane, or any other olefin. Terpolymers may include a combination of copolymers in a single polymerization. Various suppliers 12 may provide reactor feedstocks 14 to the manufacturing system 10 via pipelines, trucks, cylinders, drums, and so forth. The suppliers 12 may comprise off-site and/or on-site facilities, including olefin plants, refineries, catalyst plants, and the like. Examples of possible feedstocks 14 include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

A. Feed System

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Furthermore, in operation, the feed system 16 may also store, treat, and meter recovered reactor effluent for recycle to a reactor system 20. Indeed, operations in the feed system 16 generally receive both feedstock 14 and recovered reactor effluent streams. It should be noted that typically only a relatively small amount of fresh make-up diluent as feedstock 14 is utilized, with a majority of the diluent fed to the polymerization reactor recovered from the reactor effluent.

The feed system 16 may also prepare or condition other feedstocks 14, such as catalysts, for addition to the polymerization reactors. For example, a catalyst may be activated, as described below, and then mixed with diluent (e.g., isobutane or hexane) or mineral oil in catalyst preparation tanks. As described above, catalyst may also be recovered from the reactor effluent. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. Further, the feed system 16 typically provides for metering and controlling the addition rate of the feedstocks 14 into the reactor system 20 to maintain the desired reactor stability and/or to achieve the desired polyolefin properties or production rate.

B. Reactor System

The reactor system 20 may comprise one or more reactor vessels, such as liquid-phase reactors, gas-phase reactors, or a combination thereof. Multiple reactors may be arranged in series, in parallel, or in any other suitable combination or configuration. In polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. Increased catalyst conversion in the feed system 16 may also enable a higher MI potential in the reactor system 20.

Further, diluent may be fed into a liquid-phase reactor. The diluent may be an inert hydrocarbon that is liquid at reaction conditions, such as isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

C. Effluent Treatment and Feed Recovery

A discharge 22 of the reactors within system 20 may include the polymer fluff as well as non-polymer components, such as diluent, unreacted monomer/comonomer, and residual catalyst. The discharge 22 may be subsequently processed, such as by an effluent treatment system 24, to separate non-polymer components 26 (e.g., diluent, unreacted monomer, and catalyst) from polymer fluff 28.

The recovered non-polymer components 26 may be processed, such as by a fractionation system 30, to remove undesirable heavy and light components. Fractionated product streams 32 may then be returned to the reactor system 20 via the feed system 16. In addition, some or all of the non-polymer components 26 may recycle more directly to the feed system 16 (as indicated by reference numeral 34), bypassing the fractionation system 30.

The fluff 28 may be further processed within the effluent treatment system 24 and/or in an extrusion/loadout system 36, as described below. Although not illustrated, polymer granules and/or active residual catalyst intermediate in the effluent treatment system 24 may be returned to the reactor system 20 for further polymerization, such as in a different type of reactor or under different reaction conditions.

D. Extrusion/Loadout System

In the extrusion/loadout system 36, the fluff 28 is typically extruded to produce polymer pellets 38 with the desired mechanical, physical, and melt characteristics. Extruder feed may comprise additives, such as UV inhibitors and peroxides, which are added to the fluff products 28 to impart desired characteristics to the extruded polymer pellets 38. An extruder/pelletizer receives the extruder feed, comprising one or more fluff products 28 and whatever additives have been added. The extruder/pelletizer heats and melts the extruder feed which then may be extruded (e.g., via a twin screw extruder) through a pelletizer die under pressure to form polyolefin pellets 38. Such pellets 38 may be cooled in a water system disposed at or near the discharge of the pelletizer.

In general, the polyolefin pellets may then be transported to a product load-out area where the pellets may be stored, blended with other pellets, and/or loaded into railcars, trucks, bags, and so forth, for distribution to customers 40. In the case of polyethylene, the pellets 38 shipped to the customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company, LP, of The Woodlands, Tex., USA.

The polymerization and effluent treatment portions of the polyolefin manufacturing process 10 may be called the "wet" end 42 or "reaction" side of the process 10, while the extrusion/loadout portion of the polyolefin process 10 may be called the "dry" end 44 or "finishing" side of the polyolefin process 10.

E. Customers, Applications, and End-Uses

The produced polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Ultimately, the products and components formed from the pellets 38 may be further processed and assembled for distribution and sale to the consumer. For example, a polyethylene milk bottle may be filled with milk for distribution to the consumer, or the fuel tank may be assembled into an automobile for distribution and sale to the consumer.

To form end-products or components from the pellets 38, the pellets 38 are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of pellet 38 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, the polyolefin pellets 38 may also be supplied for the extrusion coating and lamination industry.

III. Catalyst Preparation System

A. Catalyst Activation

Figure 2:
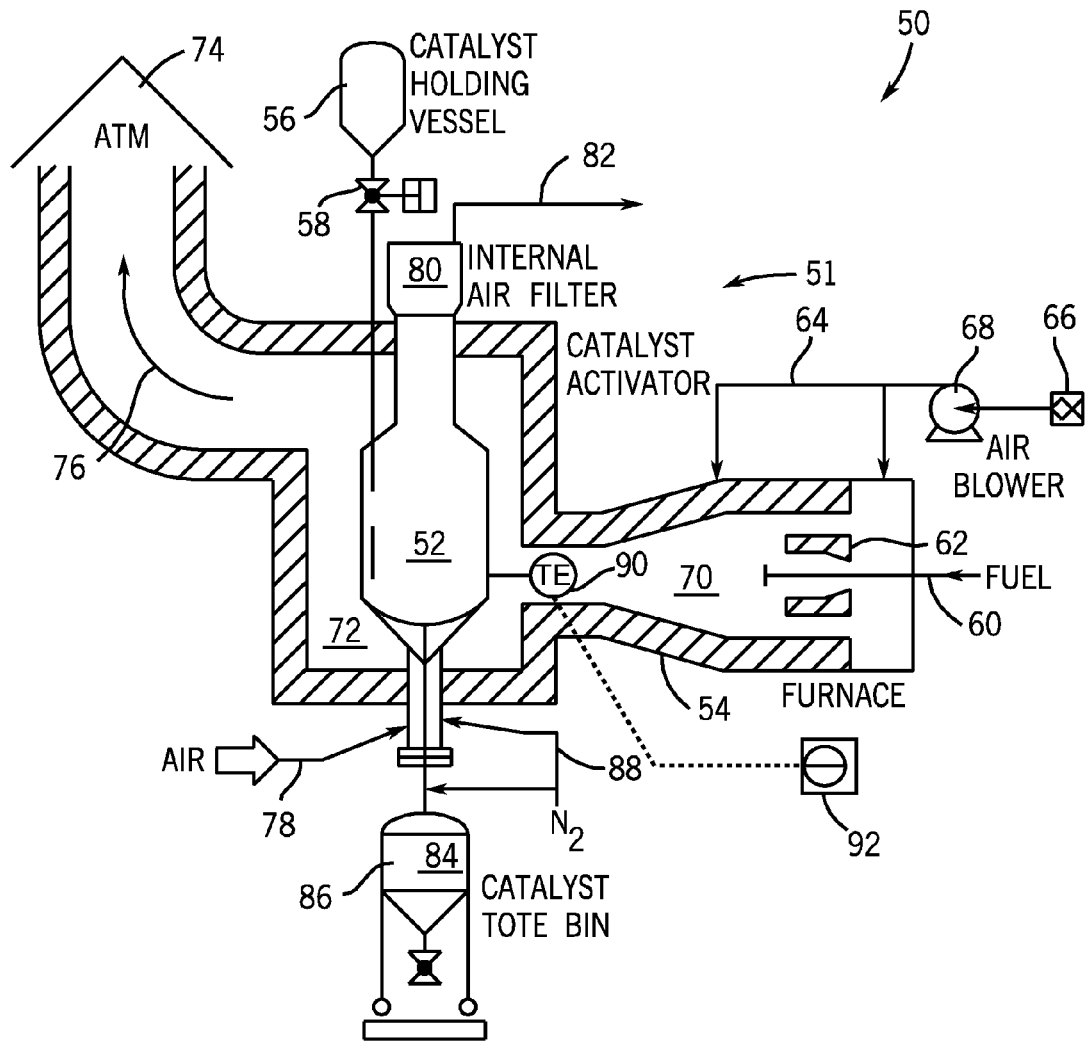
FIG. 2 is a process flow diagram of an exemplary catalyst preparation system of the feed system of FIG. 1 in accordance with an embodiment of the present technique.

As described above, hexavalent chromium ($Cr^{6+}$) may be used to catalyze the polymerization of ethylene and other comonomers into polyethylene, copolymers, and/or terpolymers. Chromium is most stable in the trivalent chromium ($Cr^{3+}$) oxidation state. Accordingly, prior to mixing and metering the catalyst, as described below, the catalyst may be activated, as illustrated in FIG. 2. For example, in the case of a chromium oxide catalyst, a catalyst activator may convert $Cr^{3+}$ to $Cr^{6+}$. In general, catalyst activation processes include passing dry air through a catalyst bed at a constant rate, while applying heat, until the catalyst reaches the desired activation temperature, at which point the catalyst is held at the activation temperature for the proper length of time. Chromium activation may occur by removing hydroxyls associated with the $Cr^{3+}$ to increase the oxidation state of the chromium. Removal of the hydroxyls may be accomplished by heating the $Cr^{3+}$ and purging the resulting water from the atmosphere surrounding the activated $Cr^{6+}$. The amount of conversion or oxidation of $Cr^{3+}$ to $Cr^{6+}$ may be relatively low, such as 0.5%. While in the reactor and in contact with the ethylene monomer, the $Cr^{6+}$ may reduce to $Cr^{2+}$.

A process flow diagram of a catalyst activator system 50 is depicted in FIG. 2. Initially, it should be noted that one or more activator systems 50 may be operated in parallel and/or series. Moreover one or more activator systems 50 may activate catalyst for one or more subsequent catalyst preparation areas, polymerization reactors, and polyolefin production lines. In one example, three to four catalyst activators operating in parallel supply activated catalyst to six polyolefin lines.

The catalyst activator system 50 may have an activator 51, wherein the activator 51 includes an internal vessel 52 which maintains the catalyst (e.g., a bed of catalyst) to be activated, and an external furnace 54 surrounding the internal vessel 52. The inside diameter of the internal vessel 52 may range from about 40 inches to about 60 inches, for example. Catalyst (e.g., $Cr^{3+}$) from a supplier (e.g., delivered in drums, tote bins, etc.) may be held in a holding vessel 56 and fed to the internal vessel 52 via an on/off valve 58, for example. Fuel 60 may be added via a sparger or pilot 62 into the furnace 54, and the fuel 60 combined with air 64 injected into the furnace via an air filter 66 and an air blower 68. Combustion may take place inside the furnace in a region 70, for example. A second region 72 may experience operating temperatures in an exemplary range of 400 to 1600° F. to heat the catalyst in the internal vessel 52. The temperature in the second region 72 may be increased, or ramped up, during the catalyst activation process by increasing the flow of fuel 60 and air 64 to the combustion region 70. The heated fluid from the second region 72 (i.e., the vessel region) may discharge to atmosphere 74, as depicted by arrow 76.

In addition to heat, oxygen may be supplied to activate the catalyst and to purge water from the internal vessel 52. Water is formed in the internal vessel 52 as entering oxygen reacts with the $Cr^{3+}$, removing the hydroxyls in the catalyst and converting the catalyst to $Cr^{6+}$. Air 78 may be injected into the bottom of the internal vessel 52 to provide the presence of oxygen inside the vessel, with heat provided by the surrounding furnace 54. The air entering the vessel 52 may exit at the top via an internal air filter 80, for example, and discharge to the atmosphere, as indicated by reference numeral 82. Activated catalyst 84 (e.g., having $Cr^{6+}$) may discharge from vessel 52 into a catalyst tote bin 86, or other container. Furthermore, nitrogen 88 may facilitate discharge of the activated catalyst 84 into the tote bin 86, and also provide an inert atmosphere in the tote bin 86.

Generally, the activated catalyst 84 contains some converted $Cr^{6+}$ and some unconverted $Cr^{3+}$. The conversion rate of $Cr^{3+}$ to $Cr^{6+}$ in the activator system 50 is denoted by a percentage of $Cr^{6+}$ in the activated catalyst 84. It is desirable to increase the conversion rate, as this value directly affects the amount of converted $Cr^{6+}$ present in the reactor. That is, at a higher conversion rate, the same amount of activated catalyst 84 contains more $Cr^{6+}$, thereby resulting in better polymerization in the loop slurry reactor. An exemplary technique for improving the $Cr^{6+}$ (e.g., 0.5%) conversion rate, as described in more detail below, includes increasing the operating temperature of the furnace 54 at an initial rate then decreasing the rate of temperature increase as the activation hold temperature is approached. That is, a temperature ramp rate may be utilized as the furnace initially heats up, then a second, lower temperature ramp rate may be used as the temperature in the furnace approaches the activation hold temperature. In addition, or alternatively, the flow rate of air 78 through the internal vessel 52 may be increased. For example, as the temperature in the furnace 54 approaches the activation hold temperature, the air flow rate may be increased then decreased again after the hold temperature is reached. The flow rate of air 78 may be adjusted by a manual valve, control valve, pressure regulator, and so forth.

In the illustrated embodiment, a temperature element 90 may sense the temperature of the bed of chromium catalyst and/or internal vessel 52. A controller 92 may read the temperature value provided by element 90 and control the temperature of the chromium catalyst. To control the temperature, the controller 92 may adjust the flow rate of fuel and/or air to the furnace 54, such as by manipulation control valves or the speed of the blower 68, for example. In some embodiments, the controller 92 may operate to increase the temperature at varying rates during different time periods. For example, the controller 92 may increase the temperature of the bed of chromium catalyst for an initial period of time at a particular rate and then increase the temperature at a different rate for a second period of time. The first period may be in a range of about 3 hours to about 7 hours, and the second period may be in a range of about 2 hours to about 6 hours. Each time period may be defined by a temperature or temperature range.

For example, the first time period may be defined by a time with temperatures that range from about 650° C. to about 750° C., and the second time period may be defined by a time with temperatures that range from about 750° C. to about 850° C. The rate during the initial period may be greater than the rate of the second or subsequent period. For example, the first rate may be in a range of about 2.0° C. per minute to about 2.5° C. per minute, and the second rate may be in a range of about 0.25° C. per minute to about 0.50° C. per minute. Similarly, different rates may be used in numerous subsequent periods. For example, a different rate may be used in a third period, wherein the rate is slower than that of the second period.

B. Catalyst Feed

Figure 3:
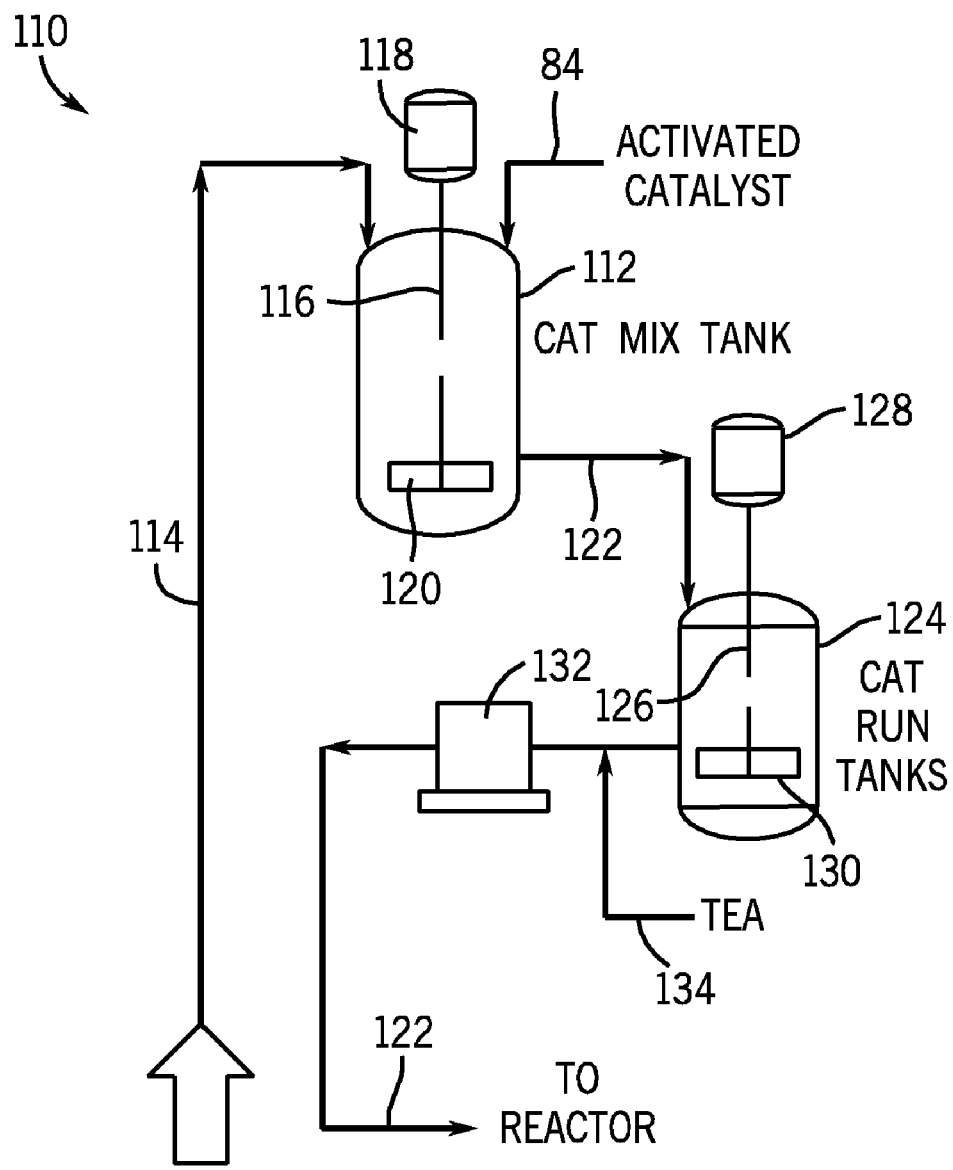
FIG. 3 is a process flow diagram of an exemplary catalyst activation system in accordance with an embodiment of the present techniques.

Referring now to FIG. 3, a process flow diagram of an exemplary catalyst preparation area 110 of the feed system 16 (FIG. 1) is depicted. A catalyst mix tank 112 receives activated catalyst 84, for example, from the catalyst tote bin 86 (FIG. 2). Olefin-free diluent 114 mixes with the catalyst 84 in the catalyst mix tank 112. An agitator 116 having a motor/drive 118 and a blade 120 may facilitate mixing of the diluent 114 and the catalyst 84 in the mix tank 112. A catalyst/diluent mixture 122 discharges from the mix tank 112 and may enter, for example, a catalyst run tank 124 for metering to the loop slurry reactor. The run tank 124 may also have an agitator 126 having a motor/drive 128 and an agitator blade 130 to maintain the catalyst mixed with the diluent. The catalyst/diluent mixture 122 may then be fed to the reactor via a metering device, such as a positive displacement pump 132. Additionally, additives, such as co-catalysts 134 (e.g., triethylaluminum), may be added to the catalyst/diluent mixture 122 before it is fed to the reactor.

IV. Techniques for Improving Hexavalent Chromium Conversion

A. Experimental Procedure

As discussed above, trivalent chromium is converted to hexavalent chromium by heating the trivalent chromium and passing air through the chromium bed. The rate at which the catalyst is heated is known as the "ramp" rate and may be denoted in degrees Celsius per minute (° C./min). The flow rate of air through the chromium bed may be denoted in feet per second (ft/s). As discussed below, adjusting the ramp rate and/or the air flow rate during activation of the catalyst may improve the $Cr^{6+}$ conversion rate.

The conversion of $Cr^{3+}$ to $Cr^{6+}$ is dependent on the moisture content of the air in the catalyst bed, denoted in parts of water per million. For example, the relationship between percent conversion to $Cr^{6+}$ and moisture may be expressed in the following equations:

$$\text{at } 800° \text{ C., } \% \, Cr^{6+} = 0.88/(0.00048m+1.1^{0.52}) \tag{1}$$

$$\text{at } 700° \text{ C., } \% \, Cr^{6+} = 0.85/(0.000018m+1)^2, \text{ and} \tag{2}$$

$$\text{at } 600° \text{ C., } \% \, Cr^{6+} = 0.84/(0.000012m+1)^{0.29} \tag{3}$$

where % $Cr^{6+}$ is weight percent of $Cr^{6+}$ in the catalyst and m is water in parts per million. Based on these equations, the conversion of $Cr^{6+}$ may be estimated from the moisture level in the activator.

Figure 4:
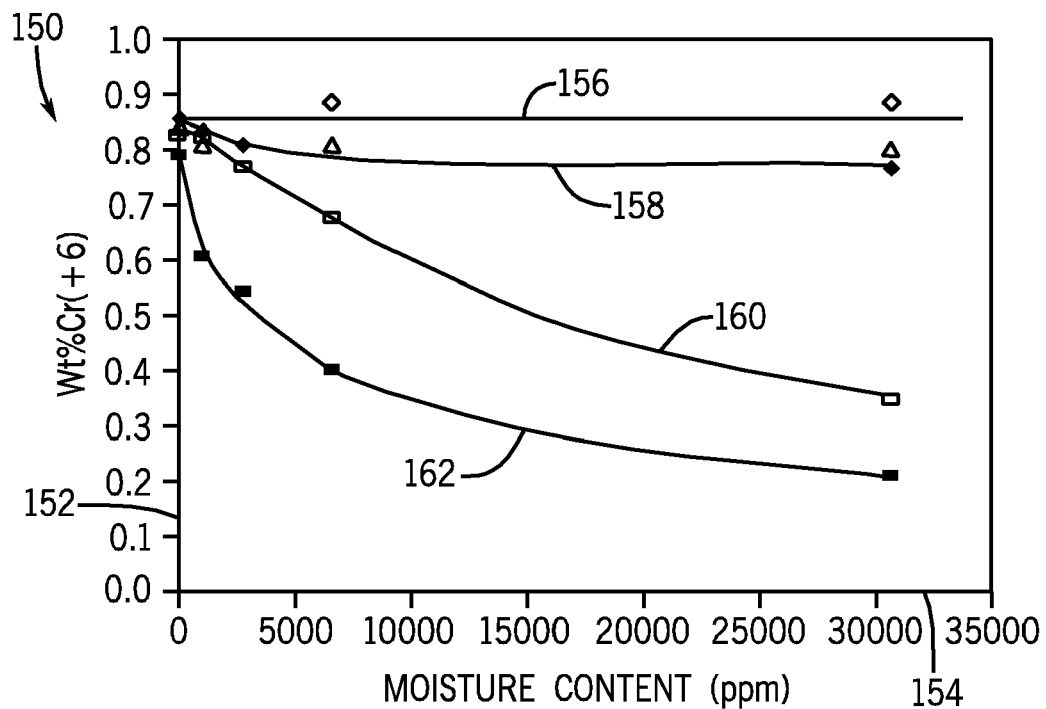
FIGS. 4-13 are exemplary activation schemes in accordance with embodiments of the present techniques.

FIG. 4 is a graph 150 of the weight percent of $Cr^{6+}$ in the catalyst 152 versus the moisture content 154 at various temperatures. In the illustrated graph 150, a plot 156 represents the relationship between weight percent of $Cr^{6+}$ and moisture content at 400-500° C. Similarly, a plot 158 represents the relationship between weight percent of $Cr^{6+}$ and moisture content at 600° C. It can be seen from these plots that $Cr^{6+}$ conversion is not very moisture-dependent at the denoted temperatures. However, at higher temperatures, the moisture content may greatly affect the conversion of $Cr^{6+}$. For example, at 700° C., a moisture content of approximately 30,000 ppm may correspond to about 0.4% $Cr^{6+}$ in the catalyst, while a moisture content of approximately 0 ppm may correspond to about 0.8% $Cr^{6+}$ in the catalyst, as illustrated by a plot 160. Similarly, in a plot 162 taken at 800° C., a moisture content of approximately 30,000 ppm may correspond to about 0.2% $Cr^{6+}$ in the catalyst, while a moisture content of approximately 0 ppm may correspond to about 0.8% $Cr^{6+}$ in the catalyst.

Figure 5:
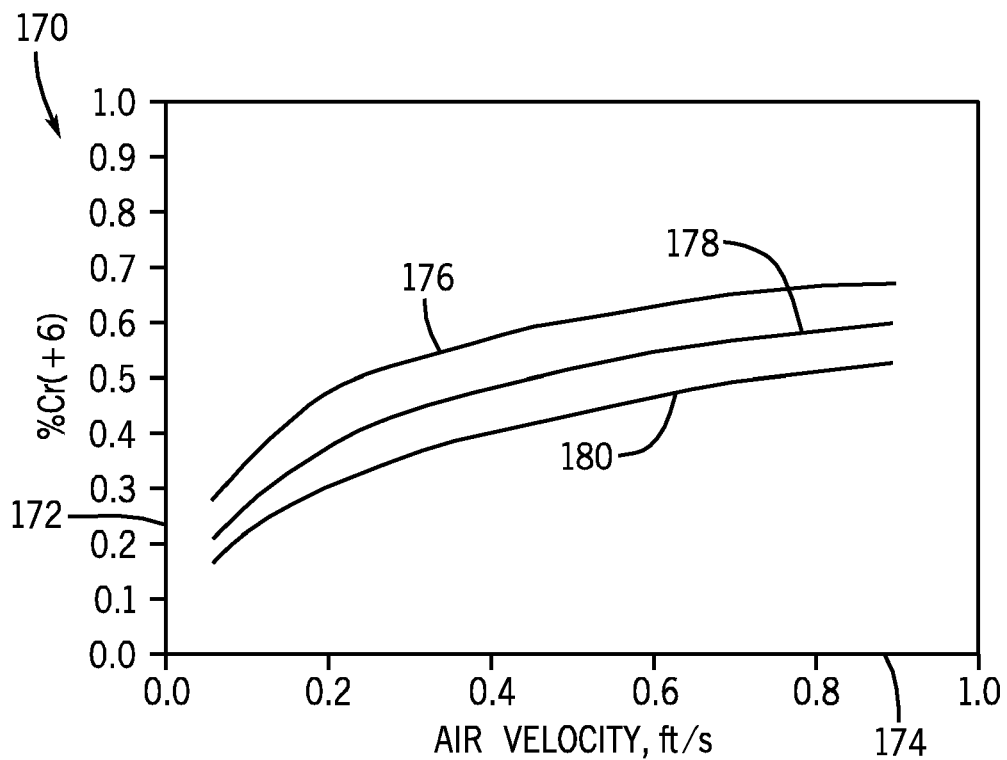

Based on the relationship between $Cr^{6+}$ conversion, moisture content, and temperature illustrated in FIG. 4, the conversion of $Cr^{6+}$ may be improved or shortened by reducing the moisture content in the activator. Reduction of the moisture content may be achieved by adjusting the ramp rate and/or the air flow rate through the activator, as described in more detail below. Accordingly, FIG. 5 illustrates a graph 170 of the weight percent of $Cr^{6+}$ in the catalyst 172 versus the air flow rate 174 at various ramp rates. A plot 176 represents the chromium content 172 versus air flow 174 at a ramp rate of approximately 0.56° C./min. Similarly, plots 178 and 180 represent the chromium content 172 versus air flow rate 174 at ramp rates of about 1.39° C./min and 2.7° C./min, respectively. It can be seen from the graph 170 that maximum $Cr^{6+}$ conversion occurs at a relatively higher air flow rate and lower ramp rate.

B. Activation Scheme

Figure 6:
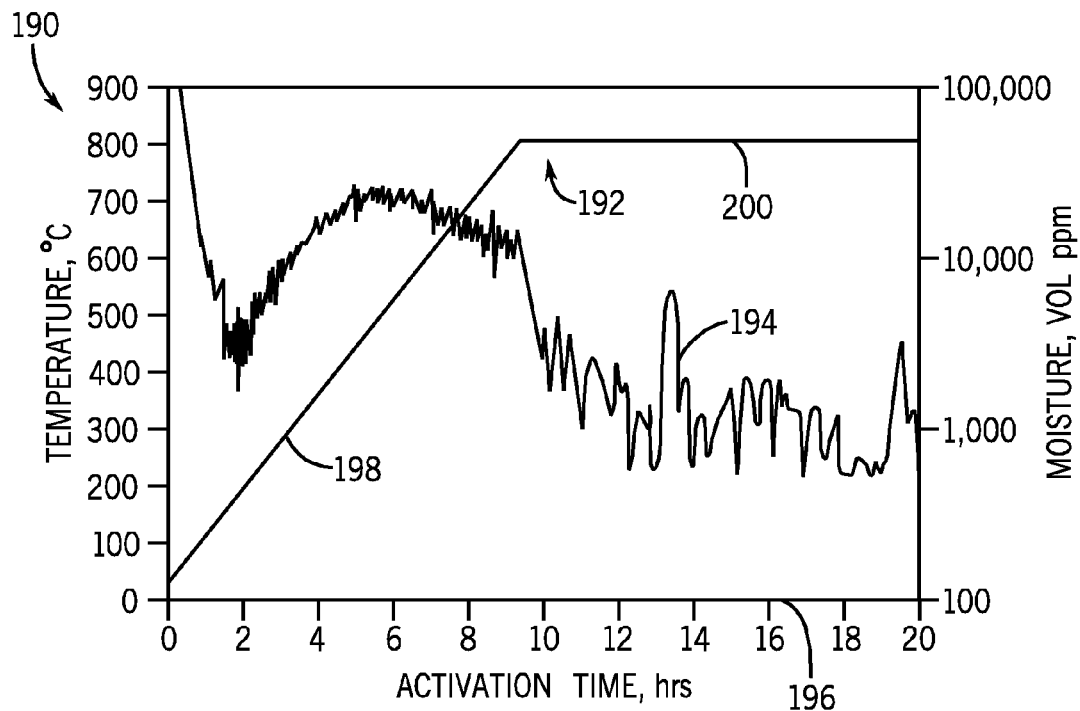

Traditionally, the temperature in catalyst activators has been ramped up to the activation or hold temperature at a generally constant ramp rate with a constant air flow rate. For example, prior art FIG. 6 is an activation scheme 190 including a temperature profile 192 and a moisture profile 194 relative to activation time 196. The predicted results for the activation scheme 190 are based on an activator with a diameter of 42 inches holding a catalyst charge of 750 pounds. The resulting bed depth is 7.2 feet. The entry parameters for the activation scheme 190 are displayed in Table 1.

TABLE 1

Entry Parameters for the Prior Art Activation Scheme Illustrated in FIG. 6

| Phase | Ramp | Hold |
|---|---|---|
| Upper Temp (° C.) | 800 | 800 |
| Ramp Rate (° C./min) | 1.39 | 0 |
| Gas Flow (ft/s) | 0.24 | 0.24 |
| Time (hrs) | 9.3 | 12 |

In the illustrated embodiment, the total activation time is 21.3 hours. The temperature profile 192 shows a linear ramp portion 198 up to 800° C. then a hold portion 200 for the remainder of the activation time 196. The moisture profile 194, depicted on a logarithmic scale, increases as the temperature rises then decreases as the temperature levels out. The moisture profile 194 becomes relatively steady in the hold portion 200 of the temperature profile 192. Resulting moisture levels and corresponding predicted $Cr^{6+}$ conversions for the activation scheme 190 are displayed in Table 2.

TABLE 2

Predicted $Cr^{6+}$ Conversion for the Prior Art Activation Scheme Illustrated in FIG. 6

| Temp (° C.) | $H_2O$ (ppm) | $Cr^{6+}$ (wt %) |
|---|---|---|
| 500 | 22,935 | 0.90 |
| 600 | 22,623 | 0.78 |
| 700 | 15,300 | 0.52 |
| 800 | 8,585 | 0.37 |

Generally, the overall $Cr^{6+}$ conversion is denoted by the minimum $Cr^{6+}$ weight percent value. Accordingly, the prior art activation scheme 190 results in a 0.37% conversion to $Cr^{6+}$.

C. Temperature Ramp Profiles

Based on the plots 176, 178, and 180 (FIG. 5), it may be desirable to decrease the temperature ramp rate in the activator to improve the $Cr^{6+}$ conversion. However, this solution is not tenable as slowing down catalyst production may significantly impede polymer production in a plant. Accordingly, in an illustrated embodiment, a non-linear temperature profile may be utilized to achieve improved conversion results without increasing the time it takes to prepare a batch of activated catalyst for addition to the reactor. In another embodiment, the non-linear temperature profile may enable comparable production of catalyst with a significant reduction in total activation time. By decreasing the total activation time, more catalyst may be activated in a given activator, advantageously increasing the throughput of the reactor.

Figure 7:
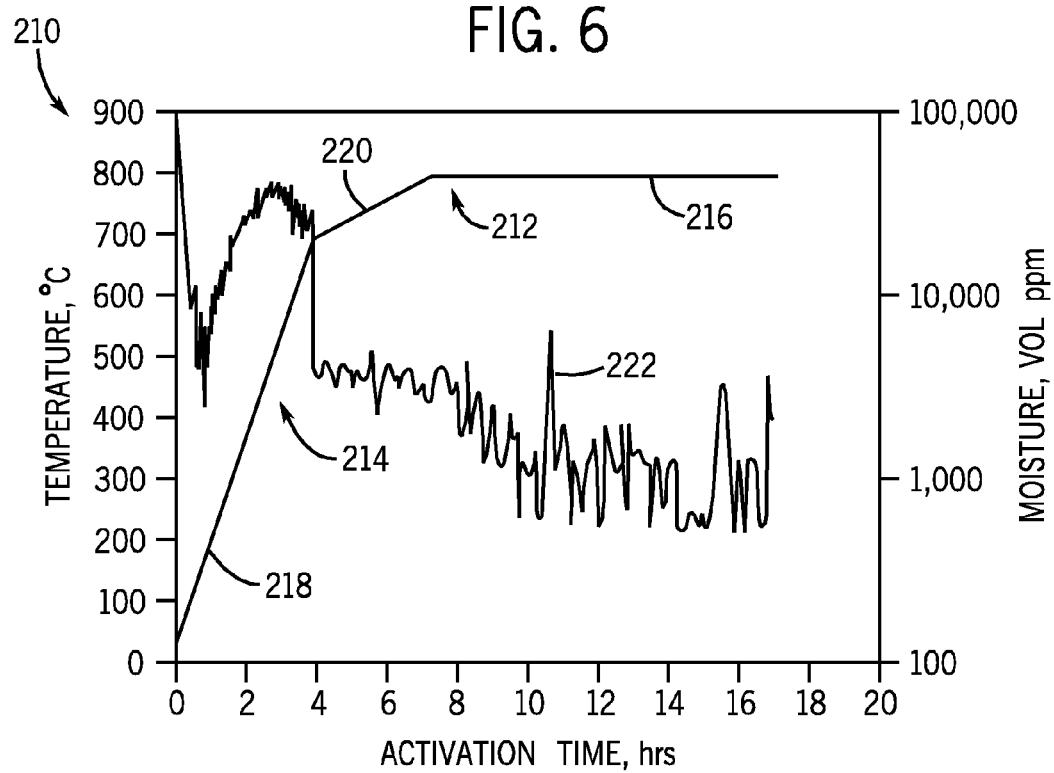

In one embodiment, illustrated as an activation scheme 210 in FIG. 7, a temperature profile 212 may include a bi-linear ramp portion 214 and a hold portion 216. A first section 218 of the bi-linear ramp portion 214 may have a higher ramp rate than a second section 220 of the bi-linear ramp portion 214. The hold portion may utilize the same parameters as the prior art activation profile 190 (FIG. 6). The entry parameters for the activation scheme 210 are displayed in Table 3.

TABLE 3

Entry Parameters for the Activation Scheme 210 Illustrated in FIG. 7

| Phase | Ramp | | Hold |
|---|---|---|---|
| Subphase | Section 1 | Section 2 | N/A |
| Upper Temp (° C.) | 700 | 800 | 800 |
| Ramp Rate (° C./min) | 2.22 | 0.39 | 0 |
| Gas Flow (ft/s) | 0.24 | 0.24 | 0.24 |
| Time (hrs) | 5.06 | 4.29 | 12 |

The ramp rate in the second section 220 of the bi-linear ramp portion 214 may be significantly less than the ramp rate in the first section 218, as illustrated in FIG. 7. In addition, this decrease may occur as the temperature in the activator approaches the hold temperature. This temperature profile 212 may be desirable because, as illustrated in the graph 150 (FIG. 4), moisture content has a much greater effect on $Cr^{6+}$ conversion at higher activator temperatures. This phenomenon, combined with the finding that $Cr^{6+}$ conversion is better when a lower ramp rate is utilized (FIG. 5), suggests that the higher ramp rate may be employed at lower activator temperatures, where moisture content is less of a factor in $Cr^{6+}$ conversion. By decreasing the ramp rate at the end of the ramp portion 214, improved $Cr^{6+}$ conversion may be achieved without requiring a greater activation time. A moisture profile 222 shows that the moisture level in the activator decreases after a shorter time period when using the activation scheme 210. That is, the moisture level in the activator is lower for a greater portion of the activation, resulting in improved catalyst conversion. Moisture levels and corresponding predicted $Cr^{6+}$ conversions for the activation scheme 210 are displayed in Table 4.

TABLE 4

Predicted $Cr^{6+}$ Conversion for the
Activation Scheme 210 Illustrated in FIG. 7

| Temp (° C.) | $H_2O$ (ppm) | $Cr^{6+}$ (wt %) |
|---|---|---|
| 500 | 36,696 | 0.90 |
| 600 | 36,197 | 0.76 |
| 700 | 12,590 | 0.56 |
| 800 | 3,256 | 0.52 |

As can be seen in the Table 4, the activation scheme 210 having the bi-linear ramp portion 214 produces an approximately 0.52% conversion to $Cr^{6+}$. This conversion is much higher than the 0.37% conversion seen in the prior art activation scheme 190 (FIG. 6). Specifically, the activation scheme 210 (FIG. 7) produces approximately 40% more $Cr^{6+}$ than the prior art activation scheme 190 (FIG. 6).

Figure 8:
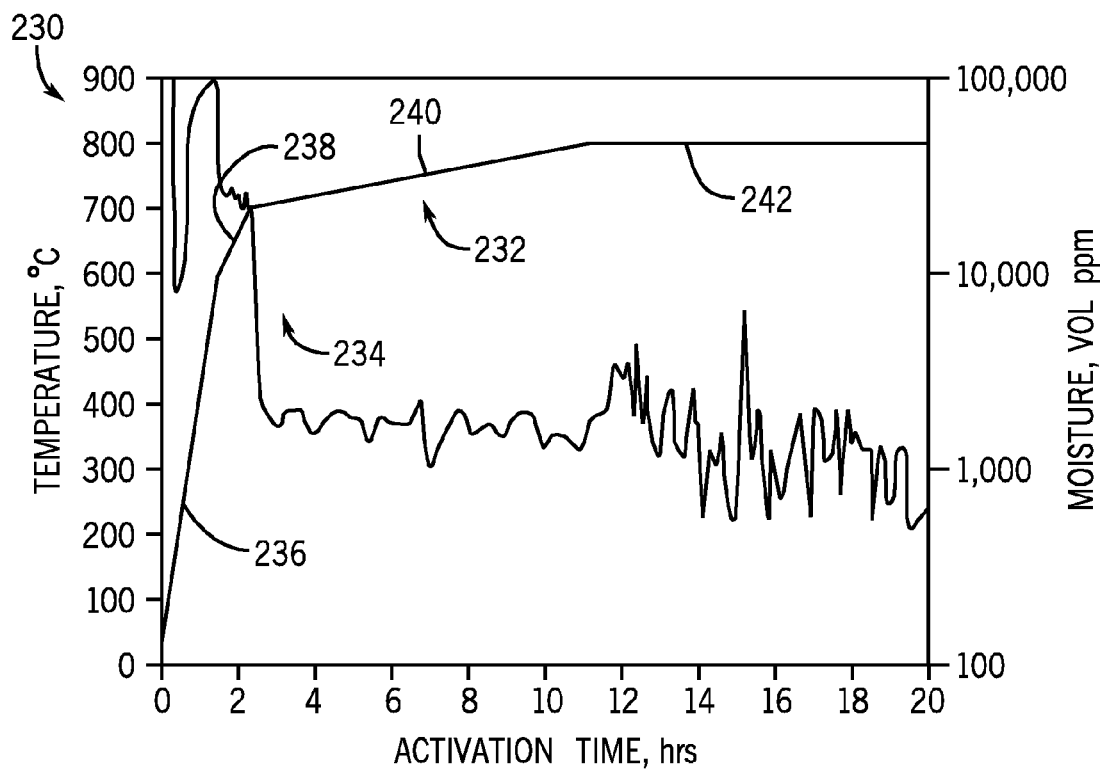

Further $Cr^{6+}$ conversion improvements may be achieved by utilizing an even higher initial ramp rate and decreasing the ramp rate in stages, as illustrated by an activation scheme 230 in FIG. 8. In the activation scheme 230, a temperature profile 232 includes a tri-linear ramp portion 234 having a first section 236 with a very high ramp rate, a second portion 238 with a lower ramp rate, and a third portion 240 with a significantly lower ramp rate. In addition, because the third portion 240 utilizes such a slow ramp rate, a hold portion 242 may be shortened compared to the prior art activation scheme 190 (FIG. 6). The entry parameters for the activation scheme 230 are display in Table 5.

TABLE 5

Entry Parameters for the Activation
Scheme 230 Illustrated in FIG. 8

| Phase | Ramp | | | Hold |
|---|---|---|---|---|
| Subphase | Section 1 | Section 2 | Section 3 | N/A |
| Upper Temp (° C.) | 600 | 700 | 800 | 800 |
| Ramp Rate (° C./min) | 6.00 | 2.00 | 0.18 | 0 |
| Gas Flow (ft/s) | 0.24 | 0.24 | 0.24 | 0.24 |
| Time (hrs) | 1.60 | 0.83 | 9.26 | 9.6 |

The total activation time in the activation scheme 230 is 21.3 hours, as with the activation scheme 210 (FIG. 7) and the prior art activation scheme 190 (FIG. 6). Moisture levels and corresponding predicted $Cr^{6+}$ conversions for the activation scheme 230 are displayed in Table 6.

TABLE 6

Predicted $Cr^{6+}$ Conversion for the
Activation Scheme 230 Illustrated in FIG. 8

| Temp (° C.) | $H_2O$ (ppm) | $Cr^{6+}$ (wt %) |
|---|---|---|
| 500 | 99,078 | 0.90 |
| 600 | 64,185 | 0.71 |
| 700 | 10,229 | 0.60 |
| 800 | 2,080 | 0.60 |

The activation scheme 230 utilizing the temperature profile 232 with the tri-linear ramp portion 234 results in a predicted $Cr^{6+}$ conversion of 0.60% for the same activation time as in the prior art activation scheme 190 (FIG. 6) and the activation scheme 210 (FIG. 7). This conversion is approximately a 62% improvement over the conversion seen in the prior art activation scheme 190 (FIG. 6).

In further embodiments of the present technique, an activation temperature profile having a ramp portion of multiple sections may be utilized. As the number of ramp sections increases, the temperature profile may approach a curve. Generally, a higher initial ramp rate and lower final ramp rate will result in better $Cr^{6+}$ conversion. In some instances, the temperature ramp rates may be limited by activator limitations. For example, an activator may be able to achieve only a 6° C./min ramp rate, thereby limiting the initial ramp.

D. Increased Air Flow Through Catalyst

In addition to implementing a variable ramp rate in the reactor, $Cr^{6+}$ conversion may be improved by increasing the flow of air through the catalyst bed, as described above and illustrated in FIG. 5. A higher air flow rate may evacuate atmospheric moisture from the catalyst activator, thereby preventing removed water from poisoning the $Cr^{6+}$ catalyst. However, it is also sometimes disadvantageous to use very high air flow. For example, during the early stages of activation when large amounts of moisture are evolved, the high air flow rates may increase pressure in the activator. Accordingly, it may be more efficient to increase the flow rate of air through the catalyst bed during the critical stage in the activation, when it is needed most.

Figure 9:
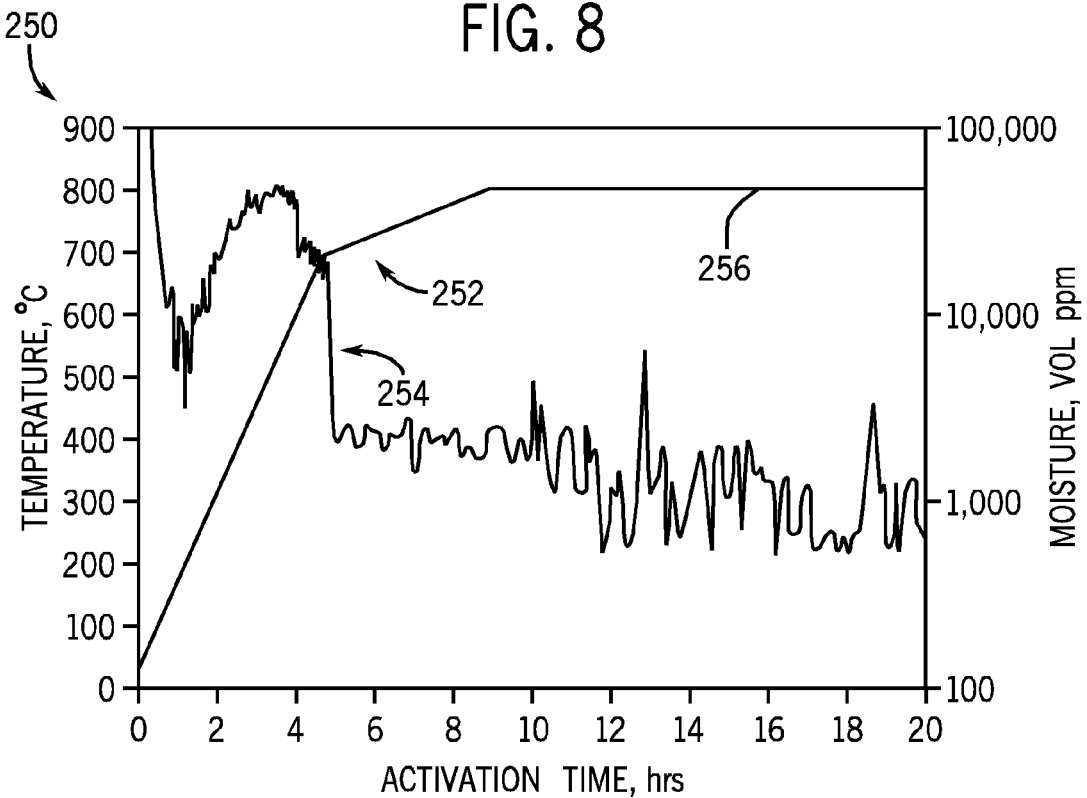

In an exemplary embodiment of the present technique, the air flow rate may be increased in conjunction with the temperature ramp rate, as illustrated by an activation scheme 250 in FIG. 9. FIG. 9 utilizes a temperature ramp profile 252 similar to the profile 212 (FIG. 7), in which a bi-linear ramp portion 254 is followed by a hold portion 256. However, the air flow rate in the scheme 250 was increased modestly at a critical stage of the activation, namely, during the last 100° C. rise in temperature and during the first 45 minutes of the hold period. Table 7 summarizes the entry parameters for the activation scheme 250.

TABLE 7

Entry Parameters for the Activation
Scheme 250 Illustrated in FIG. 9

| Phase | Ramp | | | Hold | |
|---|---|---|---|---|---|
| Subphase | Section 1 | Section 2 | Section 3 | Section 1 | Section 2 |
| Upper Temp (° C.) | 600 | 700 | 800 | 800 | 800 |
| Ramp Rate (° C./min) | 2.22 | 2.22 | 0.39 | 0 | 0 |
| Gas Flow (ft/s) | 0.2 | 0.33 | 0.4 | 0.4 | 0.24 |
| Time (hrs) | 4.32 | 0.75 | 4.27 | 0.75 | 11.25 |

As can be seen in FIG. 9, the activation scheme 250 results in even lower moisture during the critical period than does the activation scheme 210 (FIG. 7). Furthermore, the total activation time in the activation scheme 250 is 21.3 hours, as with the activation schemes 210 (FIG. 7), 230 (FIG. 8), and the prior art activation scheme 190 (FIG. 6). Moisture levels and corresponding predicted $Cr^{6+}$ conversions for the activation scheme 250 are displayed in Table 8.

TABLE 8

Predicted $Cr^{6+}$ Conversion for the
Activation Scheme 250 Illustrated in FIG. 9

| Temp (° C.) | $H_2O$ (ppm) | $Cr^{6+}$ (wt %) |
|---|---|---|
| 500 | 43,991 | 0.90 |
| 600 | 34,592 | 0.76 |
| 700 | 8,833 | 0.63 |
| 800 | 2,120 | 0.60 |

The activation scheme 250 utilizing the temperature profile 252 with the bi-linear ramp portion 254 and the increased air flow rate during the critical period results in a predicted $Cr^{6+}$ conversion of 0.60% for the same activation time as in the prior art activation scheme 190 (FIG. 6) and the activation scheme 210 (FIG. 7). This conversion is approximately a 62% improvement over the conversion seen in the prior art activation scheme 190 (FIG. 6).

Figure 10:
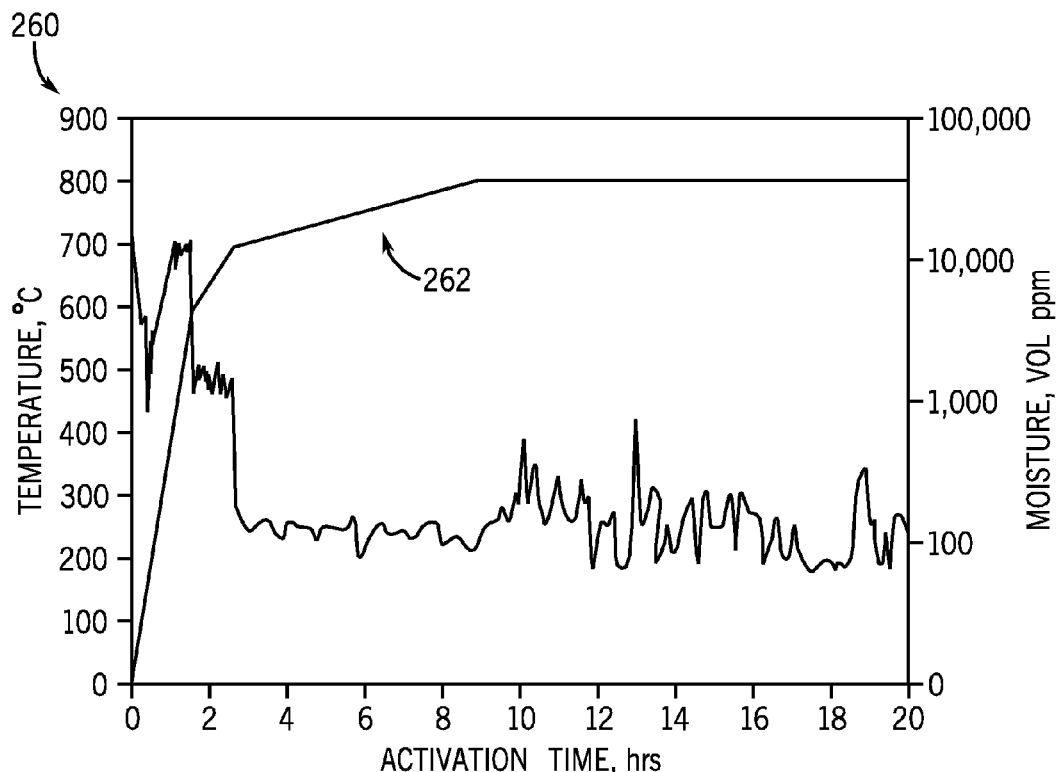

Furthermore, even higher $Cr^{6+}$ conversion may be achieved by employing a tri-linear temperature ramp in conjunction with an increased air flow rate during the critical period, as illustrated by an activation scheme 260 in FIG. 10. A temperature profile 262 is the same as the temperature profile 232 (FIG. 8). However, as in the activation scheme 250 (FIG. 9), the air flow rate through the catalyst bed is also increased during the critical stage in the last 100° C. rise in temperature and the first 45 minutes of the hold period. Table 9 summarizes the entry parameters for the activation scheme 260.

TABLE 9

Entry Parameters for the Activation
Scheme 260 Illustrated in FIG. 10

| Phase | Ramp | | | Hold | |
|---|---|---|---|---|---|
| Subphase | Section 1 | Section 2 | Section 3 | Section 1 | Section 2 |
| Upper Temp (° C.) | 600 | 700 | 800 | 800 | 800 |
| Ramp Rate (° C./min) | 6.00 | 1.60 | 0.25 | 0 | 0 |
| Gas Flow (ft/s) | 0.2 | 0.33 | 0.45 | 0.45 | 0.2 |
| Time (hrs) | 1.60 | 1.04 | 6.67 | 0.75 | 11.25 |

Again, the activation scheme 260 results in lower moisture during the critical period than do the activation schemes 210 (FIG. 7), 230 (FIG. 8), and 250 (FIG. 9). Furthermore, the total activation time in the activation scheme 260 is 21.3 hours, as with the other embodiments and the prior art activation scheme 190 (FIG. 6). Moisture levels and corresponding predicted $Cr^{6+}$ conversions for the activation scheme 250 are displayed in Table 10.

TABLE 10

Predicted $Cr^{6+}$ Conversion for the
Activation Scheme 260 Illustrated in FIG. 10

| Temp (° C.) | $H_2O$ (ppm) | $Cr^{6+}$ (wt %) |
|---|---|---|
| 500 | 118,894 | 0.90 |
| 600 | 66,654 | 0.71 |
| 700 | 6,137 | 0.69 |
| 800 | 1,368 | 0.66 |

Figure 11:
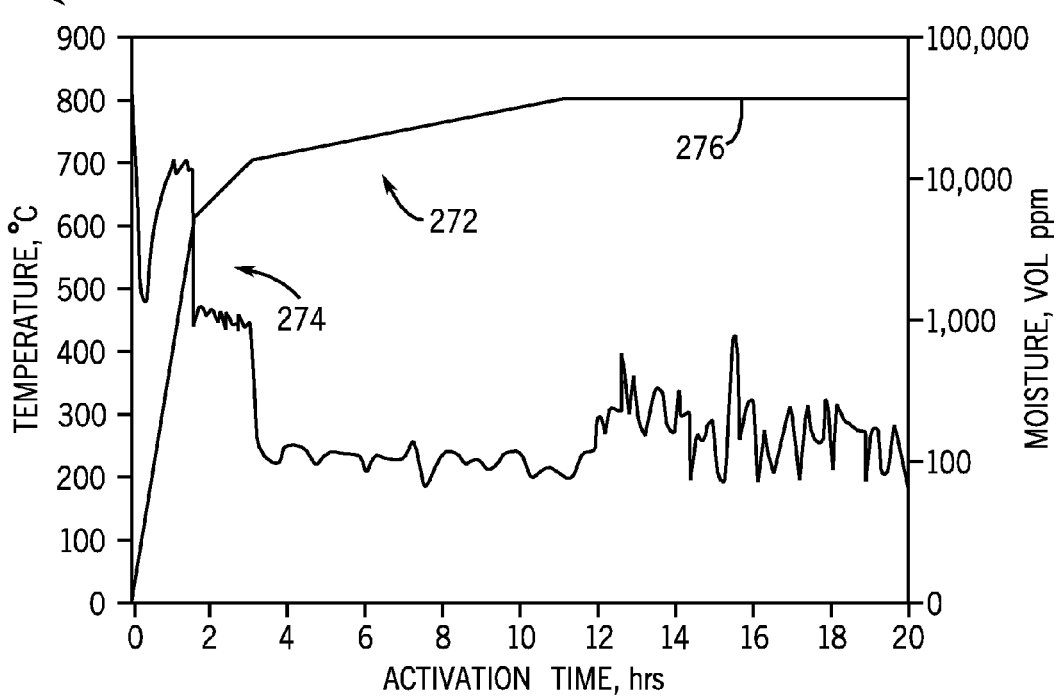

In yet another activation scheme 270, illustrated in FIG. 11, a temperature profile 272 is utilized in which second and third sections of a tri-linear temperature portion 274 are increased at even slower ramp rates than those utilized in the activation scheme 260. The air flow rate is again increased during a critical stage of the activation. In addition, in order to maintain the total activation time, a hold portion 276 of the temperature profile 272 is shortened. This change does not significantly affect the catalyst conversion as the ramp rate in the third section of the tri-linear portion 274 is sufficiently low to be comparable to a hold rate. The entry parameters for the activation scheme 270 are displayed in Table 11. As shown in Table 11, the air flow rate is lowered in section 2 of the hold portion 276 with respect to the air flow rate in section 1 of the hold portion 276.

TABLE 11

Entry Parameters for the Activation
Scheme 270 Illustrated in FIG. 11

| Phase | Ramp | | | Hold | |
|---|---|---|---|---|---|
| Subphase | Section 1 | Section 2 | Section 3 | Section 1 | Section 2 |
| Upper Temp (° C.) | 600 | 700 | 800 | 800 | 800 |
| Ramp Rate (° C./min) | 6.00 | 1.00 | 0.19 | 0 | 0 |
| Gas Flow (ft/s) | 0.2 | 0.3 | 0.45 | 0.45 | 0.2 |
| Time (hrs) | 1.60 | 1.67 | 8.77 | 0.75 | 8.5 |

Table 12 displays the moisture levels and corresponding predicted $Cr^{6+}$ conversions for the activation scheme 270.

TABLE 12

Predicted $Cr^{6+}$ Conversion for the
Activation Scheme 270 Illustrated in FIG. 11

| Temp (° C.) | $H_2O$ (ppm) | $Cr^{6+}$ (wt %) |
|---|---|---|
| 500 | 118,894 | 0.90 |
| 600 | 63,602 | 0.71 |
| 700 | 4,282 | 0.73 |
| 800 | 1,146 | 0.68 |

As demonstrated in this subsection, conversion of trivalent chromium to hexavalent chromium may be greatly improved by increasing the flow rate of air through the catalyst bed in conjunction with implementing a multi-linear temperature ramp. Additionally, as described above, a curved temperature ramp profile may be approximated by continuously decreasing the temperature ramp rate throughout the ramp time. Similarly, the air flow rate may be increased through the ramp time then decreased again some time after the hold temperature is reached.

E. Shortened Activation Time

Figure 12:
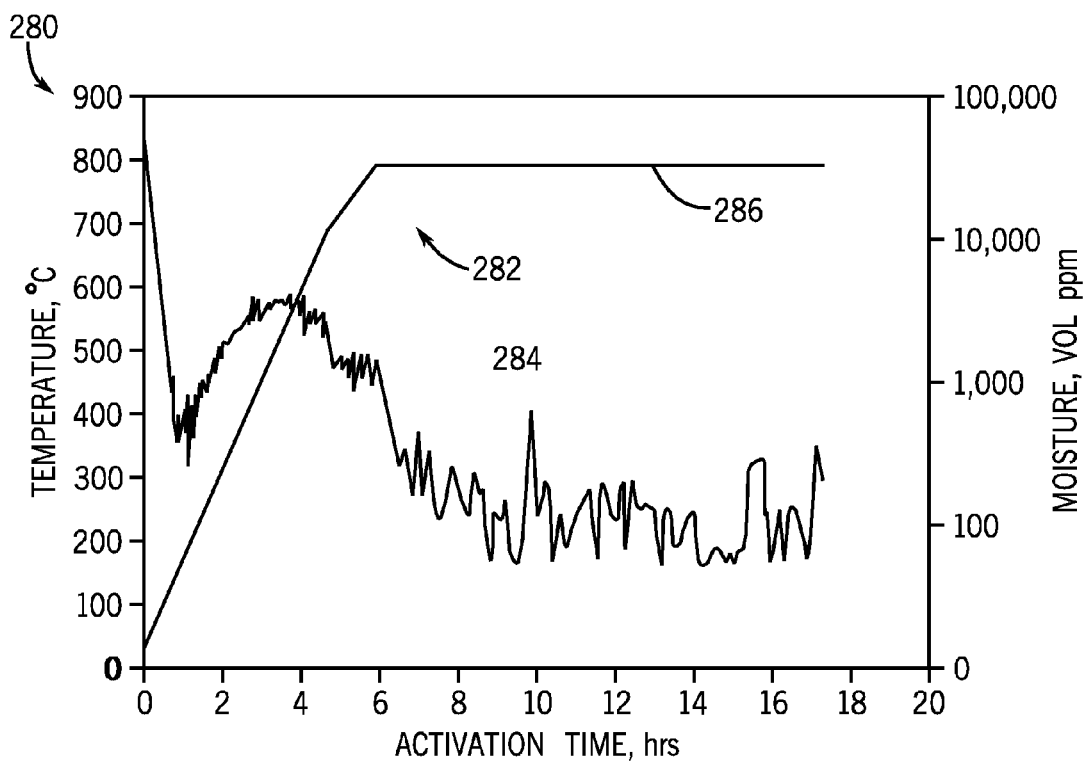

In some circumstances, it may be desirable to maintain the $Cr^{6+}$ conversion at the status quo while decreasing the activation time. The techniques described above may be employed to shorten the activation time while yielding the same $Cr^{6+}$ conversion. For example, in the prior art activation scheme 190, the overall $Cr^{6+}$ conversion was 0.37%. FIG. 12 illustrates an activation scheme 280 which results in the same conversion while shortening the activation time to 18.3 hours. A temperature profile 282 includes a bi-linear ramp portion 284 followed by a 12-hour hold portion 286. Table 13 displays the entry parameters for the activation scheme 280. Table 14 displays the moisture levels and corresponding predicted $Cr^{6+}$ conversions for the activation scheme 280.

TABLE 13

Entry Parameters for the Activation
Scheme 280 Illustrated in FIG. 12

| Phase | Ramp | | Hold |
|---|---|---|---|
| Subphase | Section 1 | Section 2 | N/A |
| Upper Temp (° C.) | 700 | 800 | 800 |
| Ramp Rate (° C./min) | 2.22 | 1.39 | 0 |
| Gas Flow (ft/s) | 0.24 | 0.24 | 0.24 |
| Time (hrs) | 5.07 | 1.20 | 12 |

TABLE 14

Predicted $Cr^{6+}$ Conversion for the
Activation Scheme 280 Illustrated in FIG. 12

| Temp (° C.) | $H_2O$ (ppm) | $Cr^{6+}$ (wt %) |
|---|---|---|
| 500 | 36,659 | 0.90 |
| 600 | 36,161 | 0.76 |
| 700 | 19,072 | 0.47 |
| 800 | 8,589 | 0.37 |

Further gains in cycle time may be accomplished by accelerating the first section of the temperature ramp portion. For example, an early ramp rate of 3.33° C./min may result in decreasing the cycle time by an additional two hours without affecting the $Cr^{6+}$ conversion or the hold time. This dependence is illustrated in Table 15.

TABLE 15

Ramp Rates and Times to Achieve
a Predicted 0.37% $Cr^{6+}$ Conversion

| Ramp Section 1 to 700° C. (° C./min) | Ramp Section 2 to 800° C. (° C./min) | Ramp Time (hrs) | Hold Time at 800° C. (hrs) | Total Time (hrs) |
|---|---|---|---|---|
| 1.39 | 1.39 | 9.3 | 12 | 21.3 |
| 2.22 | 1.39 | 6.3 | 12 | 18.3 |
| 3.33 | 1.39 | 4.1 | 12 | 16.1 |
| 4.44 | 1.39 | 3.7 | 12 | 15.7 |
| hot drop | 1.39 | 2.0 | 12 | 14.0 |

The "hot drop" Ramp Section 1 indicates that the catalyst was dropped into the activator at 600° C. and raised to 700° C. at 2.22° C./min.

F. Summary

As demonstrated in the preceding figures and tables, the conversion of trivalent chromium to hexavalent chromium may be significantly improved by employing a multi-linear or curved temperature ramp rate profile and/or an increased air flow rate around the critical period in the activator. In certain embodiments, a significant period may include the time during which the ramp temperature approaches the hold temperature and/or some fixed time period after the hold temperature is reached.

Figure 13:
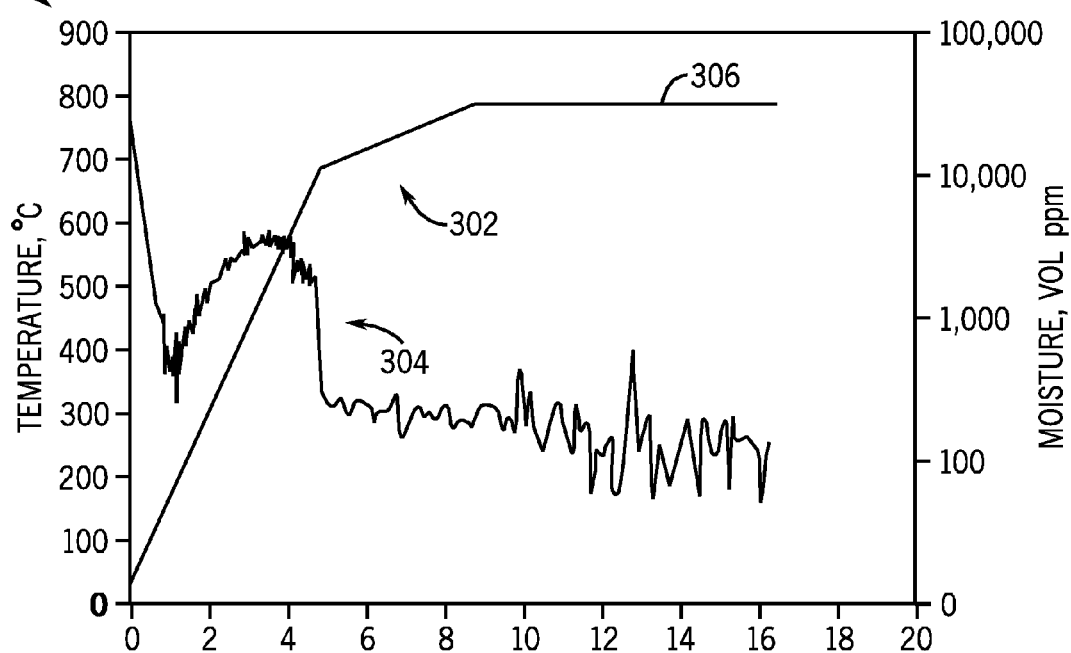

Based on the foregoing embodiments, an activation scheme 300 may be determined, an embodiment of which is illustrated in FIG. 13. The activation scheme 300 may depend on the desired $Cr^{6+}$ conversion, total activation time, activator limitations, and so forth. As described in Table 16, the activation scheme 300 may employ a temperature profile 302 having a bi-linear temperature ramp portion 304 and a shortened hold portion 306. In addition, the air flow rate through the catalyst bed may be increased as the hold temperature is approached and held for approximately 45 minutes after the hold temperature is reached.

TABLE 15

Entry Parameters for the Optimized Activation
Scheme 300 Illustrated in FIG. 13

| Phase | Ramp | | | Hold | |
|---|---|---|---|---|---|
| Subphase | Section 1 | Section 2 | Section 3 | Section 1 | Section 2 |
| Upper Temp (° C.) | 600 | 700 | 800 | 800 | 800 |
| Ramp Rate (° C./min) | 2.22 | 2.22 | 0.39 | 0 | 0 |
| Gas Flow (ft/s) | 0.24 | 0.3 | 0.4 | 0.4 | 0.24 |
| Time (hrs) | 4.32 | 0.75 | 4.27 | 0.75 | 7.25 |

The predicted $Cr^{6+}$ conversion for the activation scheme 300 is displayed in Table 16. Using this activation scheme 300, a $Cr^{6+}$ conversion of 0.60 weight percent may be achieved with a total activation time of just 17.3 hours.

TABLE 16

Predicted $Cr^{6+}$ Conversion for the Optimized
Activation Scheme 30 Illustrated in FIG. 13

| Temp (° C.) | $H_2O$ (ppm) | $Cr^{6+}$ (wt %) |
|---|---|---|
| 500 | 36,659 | 0.90 |
| 600 | 32,437 | 0.76 |
| 700 | 9,564 | 0.62 |
| 800 | 2,120 | 0.60 |

While the invention may be susceptible to various modifications and alternative forms, specific embodiments have been shown by way of example in the drawings and tables and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for activating a chromium catalyst, comprising:
increasing a temperature of the chromium catalyst in at least a bi-linear ramp, comprising increasing the temperature of the chromium catalyst at a first rate for a first period of time to a first temperature in a first ramp portion of the bi-linear ramp;
increasing the temperature of the chromium catalyst at a second rate for a second period of time from the first temperature to a second temperature in a second ramp portion of the bi-linear ramp that immediately follows the first ramp portion, wherein the first rate is greater than the second rate, and wherein the first period precedes the second period;
passing a fluid comprising oxygen through the chromium catalyst; and
increasing a flow rate of the fluid through the chromium catalyst from a first flow rate to a second flow rate as the temperature of the chromium catalyst approaches the second temperature.

2. The method of claim 1, comprising increasing the temperature of the chromium catalyst in at least a tri-linear ramp, comprising increasing the temperature of the chromium catalyst at a third rate for a third period of time from the second temperature to a third temperature in a third ramp portion of the tri-linear ramp that immediately follows the second ramp portion, wherein the third rate is slower than the second rate, and wherein the second period precedes the third period.

3. The method of claim 1, comprising maintaining the flow rate of the fluid through the chromium catalyst at substantially the second flow rate for a predetermined period of time after the chromium catalyst reaches the second temperature.

4. The method of claim 1, wherein the fluid comprises air.

5. The method of claim 1, comprising maintaining the chromium catalyst at the second temperature for a hold period.

6. The method of claim 3, wherein the hold period is in a range of about 9 hours to about 15 hours.

7. The method of claim 1, wherein activating the chromium catalyst comprises converting at least a portion of the chromium catalyst from $Cr^{3+}$ to $Cr^{6+}$.

8. The method of claim 1, wherein the first temperature is in a range of about 650° C. to about 750° C., and wherein the second temperature is in a range of about 750° C. to about 850° C.

9. The method of claim 1, wherein the first rate is in a range of about 2.0° C. per minute to about 2.5° C. per minute, and wherein the second rate is in a range of about 0.25° C. per minute to about 0.50° C. per minute.

10. The method of claim 1, wherein the first period is in a range of about 3 hours to about 7 hours, and wherein the second period is in a range of about 2 hours to about 6 hours.

11. A method for activating a chromium catalyst, comprising:
adding the chromium catalyst to an activator;
increasing an operating temperature of the activator to a first temperature at a first rate during a first period;
increasing the operating temperature of the activator from the first temperature to a second temperature at a second rate during a second period, wherein the first period immediately precedes the second period, and wherein the first rate is greater than the second rate;
maintaining the operating temperature at the second temperature for a hold period of time;
providing air flow through a bed of the chromium catalyst in the activator at a first flow rate during the first period; and
providing air flow through the bed of the chromium catalyst at a second flow rate during the second period.

12. The method of claim 9, comprising
maintaining air flow through the bed of the chromium catalyst at the second flow rate for at least a first portion of the hold period of time.

13. The method of claim 10, comprising lowering the air flow to a third flow rate for a second portion of the hold period of time.

14. A method of manufacturing a polyolefin, comprising:
maintaining a bed of a chromium catalyst in an activator;
increasing a temperature of the chromium catalyst at a plurality of sequentially different rates in at least a bi-linear ramp comprising increasing the temperature of the chromium catalyst at a first rate in a first ramp portion of the bi-linear ramp and increasing the temperature of the chromium catalyst at a second rate in a second ramp portion of the bi-linear ramp that immediately follows the first ramp portion, wherein the first rate is greater than the second rate;
passing a fluid comprising oxygen through the bed of the chromium catalyst at a first flow rate during the first ramp portion;
passing the fluid through the bed of the chromium catalyst at a second flow rate during the second ramp portion;
changing an oxidation state of at least a portion of the chromium catalyst to activate the chromium catalyst;
feeding the activated chromium catalyst to a reactor; and
polymerizing an olefin into a polyolefin in the reactor in the presence of the activated chromium catalyst.

15. The method of claim 12, wherein increasing the temperature comprises increasing the temperature of the chromium catalyst at a plurality of rates, wherein each subsequent rate is reduced.

16. The method of claim 12, wherein increasing the temperature comprises increasing the temperature of the chromium catalyst at a decreasing rate.

17. A method for activating a chromium catalyst, comprising:
increasing a temperature of the chromium catalyst in at least a tri-linear ramp, comprising increasing the temperature of the chromium catalyst at a first rate for a first period of time to a first temperature in a first ramp portion of the bi-linear ramp;
increasing the temperature of the chromium catalyst at a second rate for a second period of time from the first temperature to a second temperature in a second ramp portion of the tri-linear ramp that immediately follows the first ramp portion, wherein the first rate is greater than the second rate, and wherein the first period precedes the second period; and
increasing the temperature of the chromium catalyst at a third rate for a third period of time from the second temperature to a third temperature in a third ramp portion of the tri-linear ramp that immediately follows the second ramp portion, wherein the third rate is slower than the second rate, and wherein the second period precedes the third period.

18. The method of claim 15, comprising passing a fluid comprising oxygen through the chromium catalyst.

19. The method of claim 18, comprising increasing a flow rate of the fluid through the chromium catalyst from a first flow rate to a second flow rate as the temperature of the chromium catalyst approaches the second temperature.

20. A method for activating a chromium catalyst, comprising:
adding the chromium catalyst to an activator;
increasing an operating temperature of the activator to a first temperature at a first rate during a first period;
increasing the operating temperature of the activator from the first temperature to a second temperature at a second rate during a second period, wherein the first period immediately precedes the second period;
maintaining the operating temperature at the second temperature for a hold period of time;
providing air flow through a bed of the chromium catalyst in the activator at a first flow rate during the first period;
providing air flow through the bed of the chromium catalyst at a second flow rate during the second period;
maintaining air flow through the bed of the chromium at the second flow rate for at least a first portion of the hold period of time; and
lowering the air flow to a third flow rate for a second portion of the hold period of time.

* * * * *